US008572661B2

(12) United States Patent
Strong et al.

(10) Patent No.: US 8,572,661 B2
(45) Date of Patent: Oct. 29, 2013

(54) SATELLITE SIGNAL DISTRIBUTION

(75) Inventors: Stephen Strong, Dunwoody, GA (US);
Frederick R. Tuck, Dunwoody, GA
(US); Daniel Alexander Landreth,
Johns Creek, GA (US)

(73) Assignee: EchoStar Technologies L.L.C.,
Englewood, CO (US)

( * ) Notice: Subject to any disclaimer, the term of this patent is extended or adjusted under 35 U.S.C. 154(b) by 451 days.

(21) Appl. No.: 12/486,655

(22) Filed: Jun. 17, 2009

(65) Prior Publication Data
US 2010/0325670 A1 Dec. 23, 2010

(51) Int. Cl.
*H04N 7/20* (2006.01)
*H04N 7/18* (2006.01)
*H04N 7/16* (2011.01)

(52) U.S. Cl.
USPC .............. 725/71; 725/63; 725/67; 725/68; 725/74; 725/78; 725/82; 725/85; 725/143; 725/151; 725/153

(58) Field of Classification Search
USPC ........................................................ 725/34
See application file for complete search history.

(56) References Cited

U.S. PATENT DOCUMENTS

| 2002/0059637 | A1* | 5/2002 | Rakib ............................ 725/119 |
| 2002/0154055 | A1 | 10/2002 | Davis et al. |
| 2004/0068739 | A1 | 4/2004 | Russ et al. |
| 2004/0133911 | A1 | 7/2004 | Russ et al. |
| 2004/0172658 | A1* | 9/2004 | Rakib et al. ................... 725/120 |
| 2005/0097623 | A1* | 5/2005 | Tecot et al. ................... 725/136 |
| 2006/0136968 | A1 | 6/2006 | Han et al. |
| 2006/0225098 | A1 | 10/2006 | James et al. |
| 2007/0118858 | A1* | 5/2007 | Cho et al. ......................... 725/63 |
| 2007/0256094 | A1* | 11/2007 | Pugel et al. ...................... 725/34 |
| 2008/0120667 | A1 | 5/2008 | Zaltsman et al. |
| 2008/0271076 | A1* | 10/2008 | Schlack ........................... 725/39 |
| 2008/0313691 | A1* | 12/2008 | Cholas et al. .................. 725/131 |
| 2009/0007190 | A1* | 1/2009 | Weber et al. .................... 725/67 |
| 2009/0059933 | A1 | 3/2009 | Huang et al. |
| 2010/0100918 | A1 | 4/2010 | Egan, Jr. et al. |

FOREIGN PATENT DOCUMENTS

| EP | 1624685 A2 | 2/2006 |
| KR | 2004/0108067 | 12/2004 |
| WO | 2006/137894 A2 | 12/2006 |
| WO | WO 2008/114936 | 9/2008 |
| WO | WO 2010/070349 | 6/2010 |
| WO | 2010/147806 A1 | 12/2010 |

OTHER PUBLICATIONS

Invitation to Pay Additional Fees and, Where Applicable, Protest Fee including Partial International Search, dated Aug. 24, 2010, PCT/US2010/037800, 6 pages.

(Continued)

*Primary Examiner* — Justin Shepard
(74) *Attorney, Agent, or Firm* — Kilpatrick Townsend & Stockton LLP

(57) ABSTRACT

Disclosed is a system and method for receiving satellite television signals. A centralized system component may be provided in association with the satellite antenna. The centralized system component includes at least one or more tuners and one or more demodulators. The centralized component may provide output through a network adaptor that provides output through a single output, which is a coaxial cable in one embodiment. The centralized component may send output in the form of packetized data directed to one or more set-top boxes by way of a network transaction. The set-top box or boxes may be operable to receive the network transaction and to process the data, as appropriate, for display on a TV/monitor.

12 Claims, 7 Drawing Sheets

(56) References Cited

OTHER PUBLICATIONS

International Search Report dated Nov. 18, 2010, PCT/US2010/037800, 5 pages.
Ovadia, "MoCA: ubiquitous multimedia networking in the home," Proceedings of the International Society for Optical Engineering (SPIE), SPIE, USA, online vol. 6776, Jan. 1, 2007, pp. 67760C-1, XP002584642 ISSN: 0277-786X; retrieved from the Internet URL http://spiedl.aip.org/getpdf/servlet/GetPDFSci.iet?filetype=pdf&id=PS,ISDG006776000001677600C000001&idtype=cvips&prog=normal>, retrieved on May 28, 2010, the whole document, 5 pages.
Written Opinion of PCT/US2010/037800 mailed Dec. 17, 2011, 10 pages.
Examination Report of European Application No. 10 728 483.3 mailed on Dec. 11, 2012, 5 pages.

* cited by examiner

SATELLITE SIGNAL DISTRIBUTION

TECHNICAL FIELD

Implementations discussed herein are directed to systems and methods for distributing satellite signals from a satellite antenna to one or more set-top boxes or other client devices.

BACKGROUND

Satellite television reception is typically accomplished with a system that includes both indoor and outdoor components. Satellite signals typically do not penetrate into indoor locations. Accordingly, a satellite reception system typically includes a satellite antenna placed or installed outdoors. The satellite antenna may be in communication with a set-top box or other client device that is located near a television or monitor. The set-top box will typically include a tuner and other electronic components that are operable to processes satellite signals into a format suitable for display on the monitor.

A particular satellite antenna may be associated with a number of set-top boxes or client devices. Typically, the satellite antenna will provide each set-top box with a block of signals on a number of frequencies. The set-top box will then process the block of frequencies to extract a particular channel for display on a TV or monitor. In this arrangement, a dedicated line is provided from the satellite antenna to each set-top box. Typically, a coaxial cable provides the connection between the satellite antenna and the set-top box. Each set-top box generally requires a dedicated coaxial cable that is connected to the satellite antenna and that carries a full block of satellite signals. Thus, if a residence or other building houses multiple set-top boxes, each may require a separate connector run to the antenna.

SUMMARY

Implementations discussed herein are directed to a system and method for receiving satellite television signals. A centralized system component may be provided in association with the satellite antenna. The centralized system component includes at least one or more tuners and one or more demodulators. For each tuner and demodulator, the centralized system component may be operable to support a connection to a set-top box or other client device. The centralized component may also include one or more demultiplexers for each tuner and demodulator. The centralized component may provide output through a network adapter that provides output through a single output, which may be a coaxial cable in one embodiment. The centralized component may send output in the form of packetized data directed to one or more set-top boxes by way of a network transaction. The set-top box or boxes may be operable to receive the network transaction and to process the data, as appropriate, for display on a TV/monitor. In response to user input, the set-to box may also be operable to send network transactions to the centralized component requesting a channel change. Videos, including high definition video, may be stored at a particular set-top box and shared among set-top boxes or other network nodes by means of one or more network transactions.

One embodiment is directed to a satellite signal receiving system component, which includes: one or more tuners operable to receive one or input signals, each input signal including a block of intermediate frequency signals, the intermediate frequency signals having been down converted from a satellite downlink signal, each tuner operable to select and output a transponder signal from the intermediate frequency signal; one or more demodulators, each demodulator having an input connected to an output of one of the tuners, each demodulator operable to remove a carrier signal from the transponder signal received from the tuner and operable to output a baseband signal; and a network adapter operable to receive one or more baseband signals and to packetize data associated with the baseband to form one or more packets, the network adapter operable to transmit the packets across a network through a single output.

One embodiment is directed to a client device In a satellite receiving system, the client device comprising: a network adapter operable to receive a number of packets, the packets comprising a packetized stream of data received from a satellite; a decoder connected to the network adapter, the decoder operable to decode an audio, a video and/or a data stream associated with the packetized stream of data; and audio visual processing unit connected to the decoder operable to convert digital data to one or more signals having a second format and to output the signals having a second format.

One embodiment is directed to a method of receiving satellite television signals, comprising: receiving a block of intermediate frequency signals, the intermediate frequency signals having been down converted from a satellite downlink signal; in response to receiving the block of intermediate frequency signals, filtering the block of intermediate frequency signals by a tuner to remove a transponder signal; in response to filtering the block of intermediate frequency signals, demodulating the transponder signal by a demodulator to produce a baseband signal; packetizing data from the baseband signal at a network adapter to produce a packetized data; and transmitting the packetized data set from the network adapter across a network to be received by a client device.

DETAILED DESCRIPTION

Implementations discussed herein are directed to systems and methods for integrating satellite television reception with a local area network (LAN). Satellite television may be received through set-top box or other client device. As used herein, a "set-top box", "television receiver," or "client device" are used interchangeably to refer to device that is located on or near a TV or monitor and processes signals received from a satellite antenna or system component associated with a satellite antenna to produce signals in a format for display on the TV/monitor. In addition to a set-top box, the LAN may be used to interconnect a number of network nodes including, for example, gaming consoles, multimedia centers, and/or general purpose computers. The LAN may be implemented using a standard that includes coaxial cable as a physical media or interconnection means. Implementations discussed herein operate to allow signals received over a satellite link to be transmitted across the coaxial cables of the LAN. Audio, visual and/or data streams received from satellite link may be transmitted through the coaxial cables by means of the LAN protocol such that the satellite streams do not interfere with other communications that may occur between network nodes. It should be noted that any LAN or other network connector providing sufficient bandwidth and quality of service (such as HDMI cables, Ethernet cabling, CAT5 connectors, connectors using the HOMEPLUG technology of DISH Network, and so on) may likewise be employed.

Figure 1:
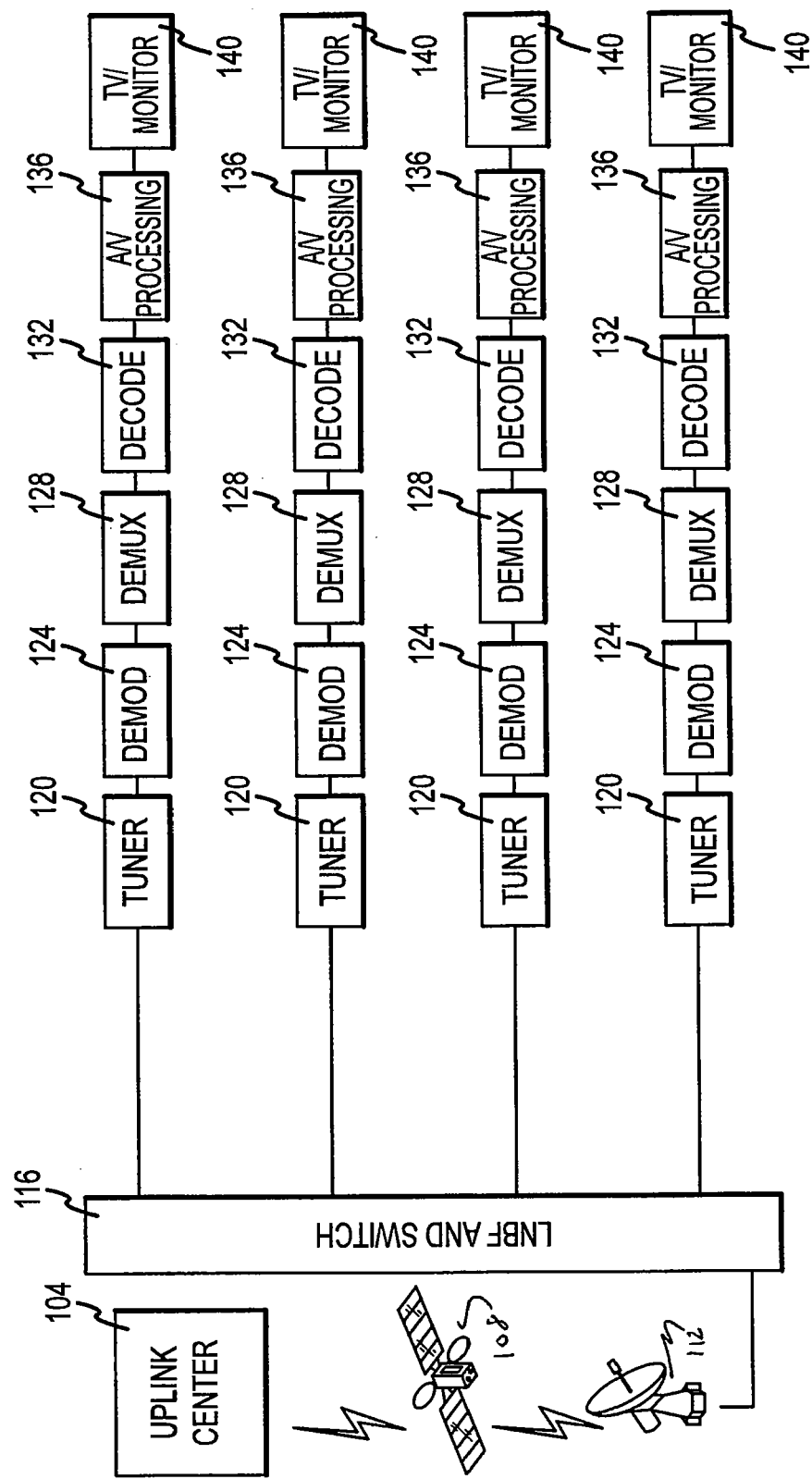
FIG. 1 is block diagram showing components of a satellite television receiving system.

FIG. 1 is a schematic that shows components and features of implementations discussed herein. The various components shown in FIG. 1 correspond to various stages associated with a satellite television transmission. Implementations discussed herein may utilize a direct broadcast satellite (DBS) system which can incorporate packetized transmission signals according to an appropriate standard, such as the MPEG-2 standard. Encrypted direct broadcast satellite DBS signals may be received as downlinked signals by a satellite antenna 112. The downlinked signals may be transmitted from a satellite 108 over an appropriate frequency band such as, for example, the C-band, the $K_u$-band or the $K_a$-band. The satellite antenna 112 may include a parabolic dish which can be approximately eighteen inches to one meter in diameter in one embodiment. Front end processing of the satellite signal may be accomplished by a low noise block down converter feed 116 (LNBF) provided at the antenna focal point. This may include a converter module with a low noise amplifier that receives the signals from the antenna 112 and a block down converter that converts the entire frequency band of satellite signals to a lower, intermediate frequency range. Typically, the LNBF 116 will convert the satellite signals to signals that are within the L-band frequency range (e.g., about 950 MHz to about 2150 MHz, although these frequencies may vary in alternative embodiments and thus are meant for illustrative purposes only).

The downconverted, L-band signals may be received by a tuner 120, which selects a specific frequency range. The L-band signals received by the tuner 120 may include a number of transponder signals received from one or more satellites 108. A particular transponder signal may include a combination or multiplex of a number of transport streams associated with one or more channels. A particular transport stream may include, for example, compressed audio or visual data. By applying band-pass filtering techniques, the tuner 120 may select a particular transponder signal from the group of signals received from the LNBF 116.

The transponder signal selected by the tuner 120 may then be demodulated by the demodulator 124. Signals associated with the various stages preceding the demodulator 124 include a combination of an information carrying signal and a sinusoidal carrier signal. Prior to transmission from the uplink center 104, the information carrying signal modulates a sinusoidal carrier signal to form the uplink signal that is transmitted to the satellite 108. The L-band signal received by the demodulator 124 represents a frequency translated version of the original uplink signal. The demodulator 124 performs an operation that is substantially an inverse of the modulation operation that occurred at the uplink center 104. Specifically, the demodulator 124 removes the sinusoidal carrier signal and outputs the information carrying signal as a baseband signal.

In addition, the demodulator 124 or other module may perform an error correction and packet synchronization functions. In error correction and packet synchronization, the demodulator 124 or other module may combine a QPSK decoder and a Reed-Solomon and Viterbi forward error corrector. The QPSK decoder may accept the digital signals and convert them to data and checksum bits corresponding to packets in the data stream. Forward error correction logic may accept the data and checksum bits and correct errors that occurred in the transmission of data stream. Following error correction and packet synchronization, the demodulator 124 or other module may output one or more compliant transport streams, for example in MPEG-2 format as defined by the ISO 13818 MPEG specification.

Output from the demodulator 124 may be directed to a demultiplexer 128. The demultiplexer 128 may be an integrated circuit that accepts the packetized, time domain multiplexed data stream of the MPEG-2 transport stream and routes the packets to various components for further processing. In so doing, the demultiplexer 128 may separate out various transport streams that are contained in a particular transponder signal. In addition to routing packets of data, the demultiplexer 128 may also unscramble encrypted data, provide buffering of the MPEG data, and/or maintain program clock reference handling to keep the local clock synchronized with the clock at the uplink center 104.

Output from the demultiplexer 128 may be directed to a decoder 132, which may process the various transport streams that are output from the demultiplexer 128. The decoder 132 may include an audio decompressor portion that is operable to decompress an audio stream, and a video decompressor portion that is operable to decompress a video stream. The audio stream and video stream may be fully compliant audio and video program elementary streams as defined by, for example, ISO 13818-2 and ISO 13818-3 of the MPEG-2 standard, respectively. Output from the decoder 132 may be directed to an audio visual (A/V) processing module 136. The A/V processing module 136 may process the video and audio streams using digital-to-analog conversion techniques or compressed digital to uncompressed digital conversion techniques, to produce one or more output signals. The resulting baseband signals may then be sent to a TV/monitor 140 through appropriate connections.

Implementations discussed herein may locate at least the tuner 120 and demodulator 124 portions proximate to the satellite antenna 112 and LNBF 116. In some embodiments, the demultiplexer 128 may be located, along with the tuner 120 and decoder 124, proximate to the satellite antenna 112 and LNBF 116. Conventionally, these components are integrated into a set-top box or receiver that is located proximate to the TV/monitor 140. With the tuner 120 and all components downstream from the tuner 120 located in a set-top box, a dedicated signal path exists between the LNBF 116 and each set-top box. In this configuration, each dedicated signal path transmits an L-band signal having all transponder signals received by the satellite antenna 112. Each such signal path typically includes a coaxial cable that extends between the satellite dish 112, which is deployed at an outdoor location, and the set-top box, which located indoors. In this arrangement, the coaxial cable that delivers signals to the set-top box cannot be shared or otherwise form a portion of a network. This is due to the fact that the L-band signals carried by cable would interfere with other signals sent across the cable.

In contrast to the aforementioned arrangement, implementations discussed herein are operable to deliver audio, visual and/or data content received from the satellite antenna 112 to a set-top box over a shared network cable. In so doing, signal processing of L-band signals may be centralized in a system component that is disposed proximate to the satellite antenna 112. Following signal processing of the L-band signals, the associated audio, video and/or data content may be sent to the set-top box by means of a local area network (LAN) transaction. A set-top box adapted to receive audio, video and/or data content in this manner may include a network adapter that allows the set-top box to send and/or receive data across a LAN. Physically, the LAN may be implemented using coaxial cables and coaxial cable splitters arranged to interconnect various network nodes including one or more set-top boxes.

Figure 2:
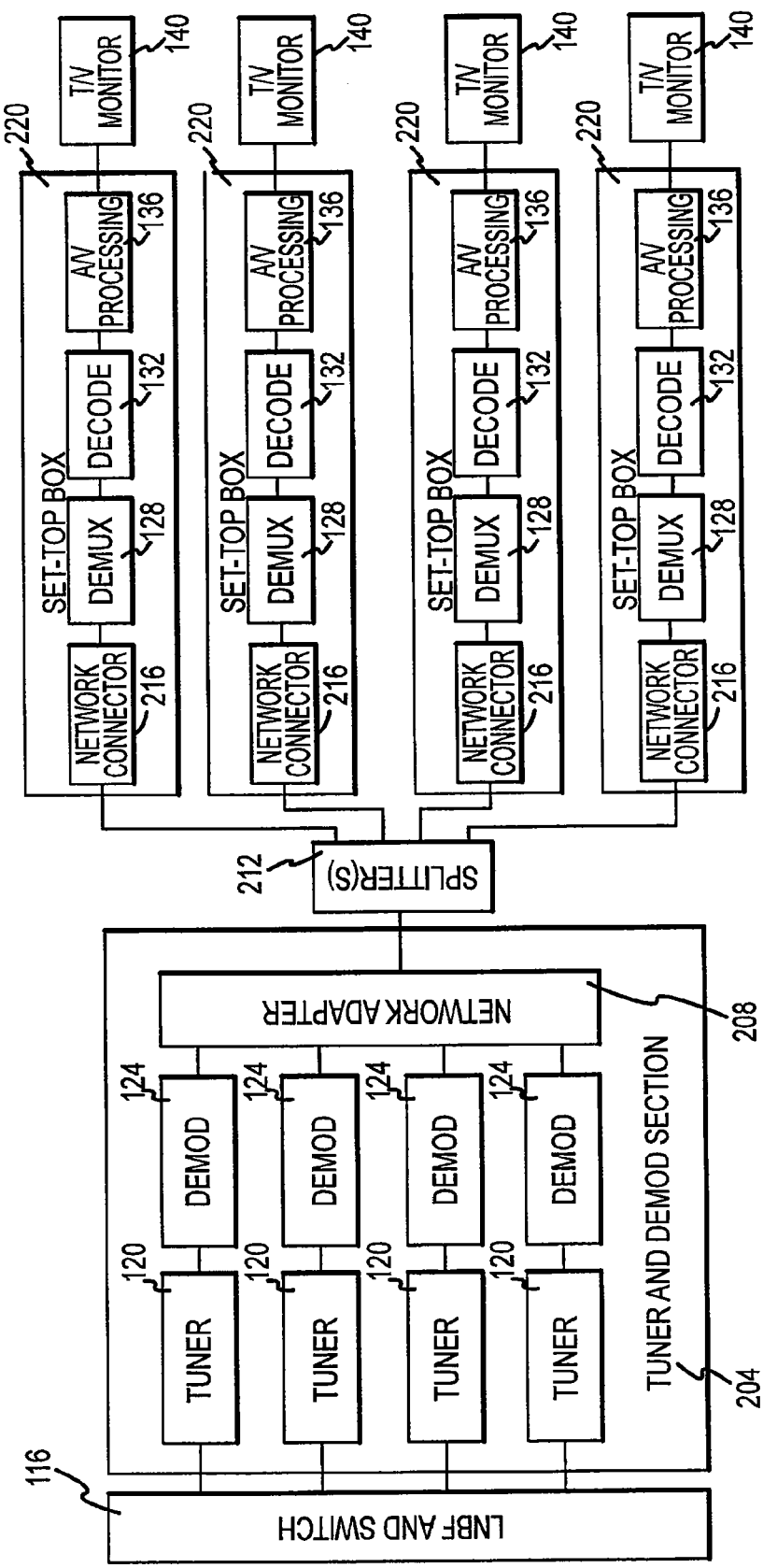
FIG. 2 is block diagram showing components of a satellite television receiving system having a tuner and demodulator.

FIG. 2 is block diagram showing components and features of a system in accordance with implementations discussed herein. The system shown in FIG. 2 includes a tuner and demodulator 204 associated with an LNBF 116. The tuner and demodulator section 204 receives a plurality of inputs from the LNBF 116. Each input to the tuner and demodulator 204 carries an L-band signal having all transponder signals received by the satellite antenna 112. Due to the inability of downlinked satellite signals to be received indoors, the LNBF 116 and the associated satellite antenna 112 may be disposed at an outdoor location. While the tuner and demodulator 204 is located proximate to the LNBF 116, the tuner and demodulator section 204 may be either indoors or outdoors.

By way of example and not limitation, the tuner and demodulator 204 shown in FIG. 2 accepts four L-band inputs from the LNBF 116. For each input, the tuner and demodulator 204 includes a separate tuner 120 and demodulator 124 component. Together, a tuner 120 and demodulator 124 may be operable to select a particular satellite transponder signal and remove the carrier signal from the transponder signal. The resulting baseband signal may be provided to a network adapter 208 portion of the tuner and demodulator 204. The network adaptor 208 may be operable to packetize data associated with the baseband signal in a predetermined format, allowing the data to be sent in a network transaction. The tuner and demodulator 204 may also include a single output connected to the network adaptor 208. The single output may include a coaxial cable that provides a communication path to one or more set-top boxes 220. For each tuner and demodulator, the tuner and demodulator section 204 may be operable to support a connection to a set-top box or other client device 140. If the tuner and demodulator communicate with a plurality of set-top boxes 220 the single coaxial cable may be provided to one or more splitters 212 that create a signal pathway to a number of set-top boxes 220.

Providing a single output from the tuner and demodulator 204 may simplify the cabling needed to distribute satellite signals in a home or other location. Specifically, only one cable is needed to extend from the satellite antenna 112. This is in contrast to traditional configurations that include a dedicated cable from the satellite antenna 112 for each set-top box in the home. Accordingly, coaxial cable lines that are typically installed in a home may be used to carrier output from the tuner and demodulator 204. Additionally, as the tuner and demodulator 204 communicate with a set-top box 220 by means of a network transaction, the coaxial cable used to distribute the satellite signals may form part of a network though which other network nodes may communicate.

Generally, the network adapter 208 is operable to run a suitable network protocol stack, such as TCP/IP, to thereby send and receive packets from a network node, such as the set-top box 220. Like the tuner and demodulator 204, the set-top box includes a network adapter 216 operable to run a TCP/IP protocol stack. In one embodiment, the media access layer of the protocol suite run by the network adapters is implemented as the Multimedia over Coax Alliance (MoCA) standard. The MoCA is a networking protocol that may facilitate home networking on existing coaxial cable in the 1 GHz microwave band using orthogonal frequency-division multiplexing OFDM modulation. Through a MoCA network high-quality multimedia content and high-speed data may distributed with throughput exceeding 100 Mbit/s. As of this writing, recent versions of the MoCA standard may achieve 400 Mbit/s of raw bandwidth, corresponding to 250-300 Mbit/s of transport data. In accordance with certain implementation, multiple networks may be run on the same cable, leading to at least 800 Mbit/s of raw bandwidth. In this implementation, a cable may carry ten or more 50 Mbit/s transport multiplexes or 10s of individual high definition (HD) channels. Alternative embodiments may employ different standards and/or network protocols, one example of which is the CopperGate standard.

The network adapter associated with a set-top box 220 may be operable to receive packetized data from the tuner and demodulator 204. In the embodiment shown in FIG. 2, the data received from the tuner and demodulator 204 may correspond to a full transponder multiplex. The set-top box 220 may be further operable to processes the transponder multiplex into a format suitable for output to the TV/monitor 140. Specifically, the set-top box 220 may include a demultiplexer 128 operable to separate out individual transport streams, a decoder 132 operable to decompress individual transport streams and an A/V processing unit 136 operable to convert digital data into an analog format or an uncompressed digital format, such as the high definition multimedia interface (HDMI) format. The set-top box 220 may provide analog signal output to the TV/monitor 140, formatted for display as appropriate.

Figure 3:
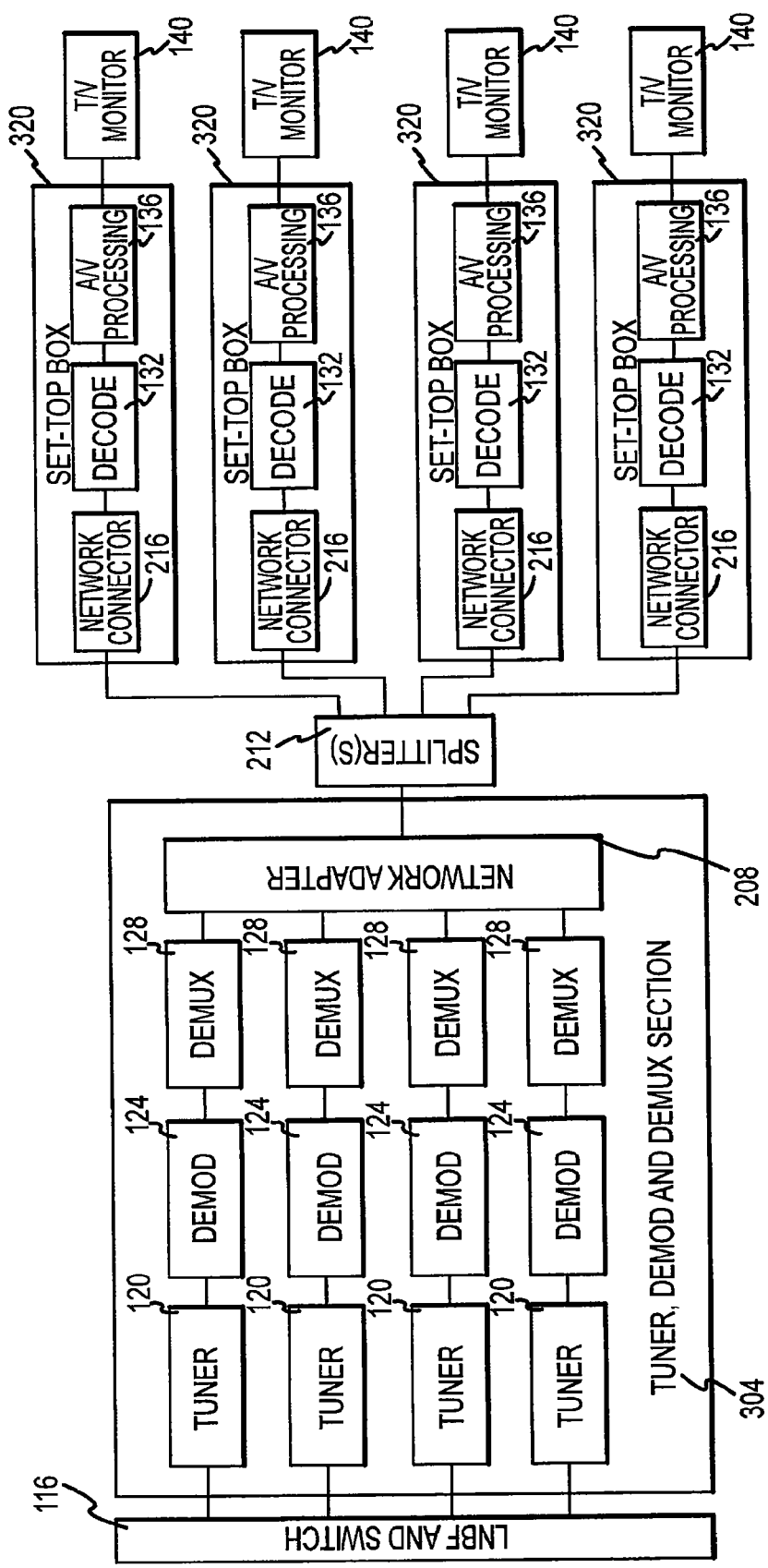
FIG. 3 is a block diagram showing components of a satellite television receiving system having a tuner, demodulator and demultiplexer section.

The system illustrated in FIG. 2 may packetize and send full transponder multiplexes across a LAN. In accordance with certain embodiments, individual transport streams may be separated out from the full transponder multiplex prior to transmission across the LAN. FIG. 3 is block diagram showing components and features of a system in accordance with embodiments discussed herein. The embodiment shown in FIG. 3 includes a tuner, demodulator and demux section 304 provided in association with an LNBF 116. The tuner, demodulator and demux section 304 receives a plurality of inputs from the LNBF 116. Each input to the tuner, demodulator and demux section 116 carries an L-band signal having all transponder signals received by the satellite antenna 112. Due to the inability of downlinked satellite signals to be received indoors, the LNBF 116 and the associated satellite antenna may be disposed at an outdoor location. While the tuner, demodulator and demux section 304 is located proximate to the LNBF 116, the tuner, demodulator and demux section 304 may be either indoors or outdoors.

By way of example and not limitation, the tuner, demodulator and demux section 304 shown in FIG. 3 accepts four L-band inputs from the LNBF 116. For each input, the tuner, demodulator and demux section 304 may include a separate tuner 120, demodulator 124 and demultiplexer 128 component. Together, a tuner 120 and demodulator 124 may be operable to select a particular satellite transponder signal and remove the carrier signal from the transponder signal. Following these operations, a demultiplexer 128 may separate out transport streams for individual programs. The resulting baseband signals that have been separated into such transport streams may be provided to a network adapter 208 portion of the tuner, demodulator and demux section 304. The network adaptor 208 may be operable to packetize data associated with the baseband signal in a predetermined format, allowing the data to be sent in a network transaction. The tuner, demodulator and demux section 304 may also include a single output connected to the network adaptor 208. The single output may include a coaxial cable that provides a communication path to one or more set-top boxes 140. If the tuner, demodulator and demux section 304 communicates with a plurality of set-top boxes 140 the single coaxial cable may be provided to one or more splitters 212 that create a signal pathway to a number of set-top boxes 140.

Generally, the network adapter 208 is operable to transmit and receive data packetized in accordance with a suitable network protocol stack, such as TCP/IP. Thus, the adapter may send and receive packets from a network node, such as a set-top box 140. Like the tuner, demodulator and demux section 304, the set-top box 140 includes a network adapter 216 operable to run a TCP/IP protocol stack. In one embodiment, the media access layer of the protocol suite run by the network adapters is implemented as the Multimedia over Coax Alliance (MoCA) standard. The network adapter associated with a set-top 140 is operable to receive packetized data from the tuner, demodulator and demux section 308. In the embodiment shown in FIG. 3, the data received from the tuner, demodulator and demux section 304 may include one or more individual transport streams. The set-top box 320 may be further operable to processes the transport streams into a format suitable for output to the TV/monitor. Specifically, the set-top box 320 may include a decoder 132 operable to decompress individual transport streams and an A/V processing unit 136 operable to convert digital data into an analog or uncompressed digital format. The set-top box 140 may provide analog signal output to the TV/monitor 140, formatted for display as appropriate.

Figure 4:
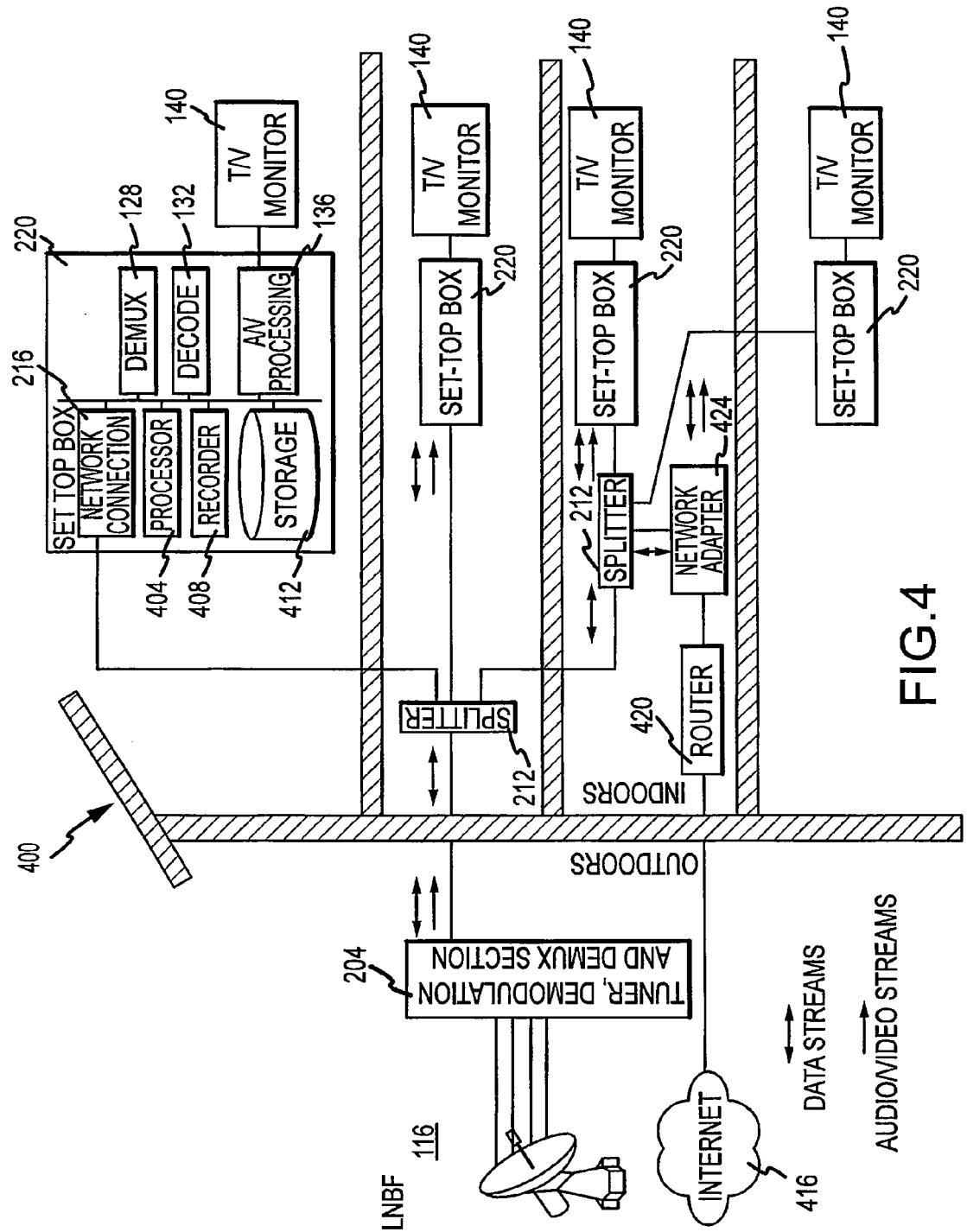
FIG. 4 is block diagram of a home networking environment including the satellite television receiving system of FIG. 2.

Implementations discussed herein provide a means for allowing a set-top box to connect to a network by means of the same cable in which the set-top box receives signals and/or data from a satellite. This concept is further illustrated in FIG. 4. FIG. 4 is a schematic illustration of a home or other client location that includes a number of set-top boxes 220 operable to receive satellite television service. The home network 400 includes a single antenna by way of example and not limitation. The antenna is connected to a tuner and demodulator 204. The tuner and demodulator section 204 includes an output that connects to a number of set-top boxes 220 through a number of splitters 212.

A set-top box 220 may include a network adapter operable to send and receive data to and from the tuner and demodulator 204. By way example and not limitation, the home network shown in FIG. 4, is implemented with the network structure of FIG. 2. Specifically, separate transponder streams are separated out from a full transponder multiplex at the set-top 220. Accordingly, the set-top box 220 shown in FIG. 4 includes a demultiplexer 128. In alternative implementations the demultiplexer 128 may be disposed at a central location as shown in FIG. 3. The set-top box 220 shown in FIG. 4 additionally includes a decoder 132 and an A/V processing unit 136, downstream from the demultiplexer 128. Output from the A/V processing unit 136 is provided to a TV/monitor 140.

The set-top box 220 may additionally include a processor 404 operable to run executable code in connection with various functions associated with the set-top box 220. For example, the processor 404 may display graphics, images, animations or other content on the TV/monitor 140. The processor 140 may be operable to receive command or other information relating to changes to the account status, and may be operable to initiate or facilitate transmission of one or more messages to the service provider. In order to facilitate communication with a service provider the set-top box 220 may be connected to the Internet 416. Specifically, the networking environment in which the set-top 220 operates may include a router 420 that is operable to direct IP packets across the Internet 416. The router 420 may be connected to the home network 400 through a network adapter 424 that provides output over coaxial cable in one embodiment. Communications to and from the set-top box 220 that occur across the Internet 416 may reach the set-top box 220 through a path that includes one or more splitters 212. Here, it is noted that the set-top box 220 includes a single cable at its input. This single cable may be used to carry communications to and from the satellite antenna 112 and across the Internet 416.

The processor 404 may perform such tasks as executing commands received from a user. User commands may be sent to the set-top through a user input device such as remote or other wireless device. One such command may be, for example, a command to change the channel that is currently displayed on the T/V monitor 140. In processing such a command, the processor 404 may receive input from a user input device and format the command in a format to be sent to the tuner and demodulator 204. Specifically, the processor 404 may packetize the channel change command and pass the packetized command to the network adapter 216. From the network adapter 216, the channel change command may be sent across the home network 400 that may be implemented using coaxial cables in one embodiment. The channel change command may be received by the tuner and demodulator 204 through its network adaptor 208. The channel change command may be processed at the tuner and demodulator 204. Specifically, the appropriate tuner 120 will be adjusted to receive the particular satellite transponder that contains the channel specified by the channel change command that was input by the user.

The processor 404 may be further operable to recall and display stored content, such as a purchased or recorded videos or programs. The set-top box 220 may include or be associated with a recorder 408, such has a Digital Video Recorder (DVR). The recorder 408 may be integrated into the set-top box 220, or it may be a stand alone device. The recorder 408 may be operated by a user who programs the device or set-top box function to record a particular program at a specified time. When the program occurs, the recorder 408 will record and store the program, which can then be viewed by a user at a convenient time. In addition to this functionality, the recorder 408 may buffer a certain amount of content during a live transmission. Buffering a live transmission allows a user to pause and/or rewind the content of the transmission and to then display the content in a non-live or delayed manner.

The set-top box 220 may include or be associated with a memory or other storage device 412, such as magnetic or optical storage. The storage device 412 may be operable to store data received from the decoded satellite signal. The storage device 412 may be volatile or non-volatile memory implemented using any suitable technique or technology such as, for example, random access memory (RAM), disk storage, flash memory, solid state and so on. The storage device 412 may be located within the set-top box 220 or separately from the set-top box 220. The storage device 412 may removable in nature. The stored data set may include audio and/or visual content to be transmitted and displayed through the display. Generally, audio/visual content may include still images, video images, animation and/or audio. Portable Network Graphics (PNG) or other appropriate formats, such as for example, Tagged Image File Format (TIFF), Joint Photographic Experts Group (JPEG), Motion Picture Experts Group (MPEG)-2, MPEG-4 may be used to display an image or video. As a result commands or setting from a user, videos or other program may be stored locally in storage 412. Stored program may include for example recorded broadcasts, pay-per-view items and/or buffered portions of a live video broadcast.

The set-top box 220 may be used to implement a system that is operable to share movies and/or other recording, including high-definition movies. Specifically, the set-top box 220 may store a particular video in storage and this video may be accessed by other network nodes, such as other set-top boxes 220. The video stored in storage 412 may include recordings that are recorded and stored by the recorder 408. The video stored in storage 412 may also be pay-per-view item or on-demand item that is rented or purchased. In one embodiment, the video stored in storage 412 may be high definition movie or video. In sharing the video stored in storage 412, the set-top box 220 may retrieve the video from storage 412 and packetize the video for transmission through the network adapter 216. The video may be sent in response to a command other request sent to the set-top box 220 from a particular network node. In one embodiment, the request for the video may originate from another set-top box 220 that is located in the home. In this instance, a video including a high definition video that is stored in one set-top box 220 may be shown on a display 140 that is associated with a second set-top box 220.

In accordance with other embodiments, a request for the stored video may be received from across the Internet 416. Specifically, as the set-top box 220 includes a network adapter that is operable to send and receive packets across the Internet 416, videos that are stored in storage may be accessed from locations that are remote from the home. In particular, the set-top box 220 may packetize the videos in an appropriate format to form a video stream that is sent through the router 420 and across the Internet 416. For example, a user may record a particular television program through the operation of the recorder 408. The user may then access the television program through his or her workplace computer, which located at a remote location.

Further, it should be noted that individual set-top boxes 220 may communicate with one another via the existing cabling (that is, across the same network used for distribution of audio, video or other programs, rather than across a separate network or backchannel). For example, one set-top box located in a first room may communicate with, and thus share data with, a second set-top box located in another room. If both set-top boxes are connected to the same splitter then they may route signals and/or data to and from one another through the splitter. Otherwise and in an embodiment employing multiple splitters, communications may be routed through the tuner/demodulator/demux section 204.

The foregoing may permit a user to retrieve and view a program stored on a set-top box that is located in a room other than the one he occupies and on a display device not directly connected to the set-top box storing the program. For example, presume a user is in a first room that contains a first display device and a first set-top box. The user may instruct the first set-top box to retrieve data (such as a program) from a second set-top box located in a different room. The first set-top box may employ the communications network disclosed herein to send a command to the second set-top box. In response to the command, the second set-top box may transmit data across the communications network to the first set-top box, which in turn may display the program on the display device. In certain embodiments, the various set-top boxes may act as a distributed storage system in a manner transparent to the user. That is, the user may not know which set-top box stores any particular data and the system may simply show the user a list of all data stored on all set-top boxes. Thus, the experience of retrieving and watching data is both seamless and constant, no matter which set-top box the user employs to access the distributed storage system.

In such an embodiment, the various set-top boxes 220 may cooperate to store data (such as audiovisual programs) in various locations. For example, a first set-top box may have a timer set to record a program but not have sufficient disk space to actually do so. The first set-top box may instruct a second set-top box to initiate recording of the program, potentially after verifying that the second set-top box has sufficient storage space to store the entire program. As yet another option, the first set-top box may record a portion of the program then instruct the second set-top box to record the remainder of the program. When a user initiates playback of the stored program from any set-top box in the communications network, the appropriate portions of the program may be retrieved in order and displayed to the user as generally described above.

Figure 5:
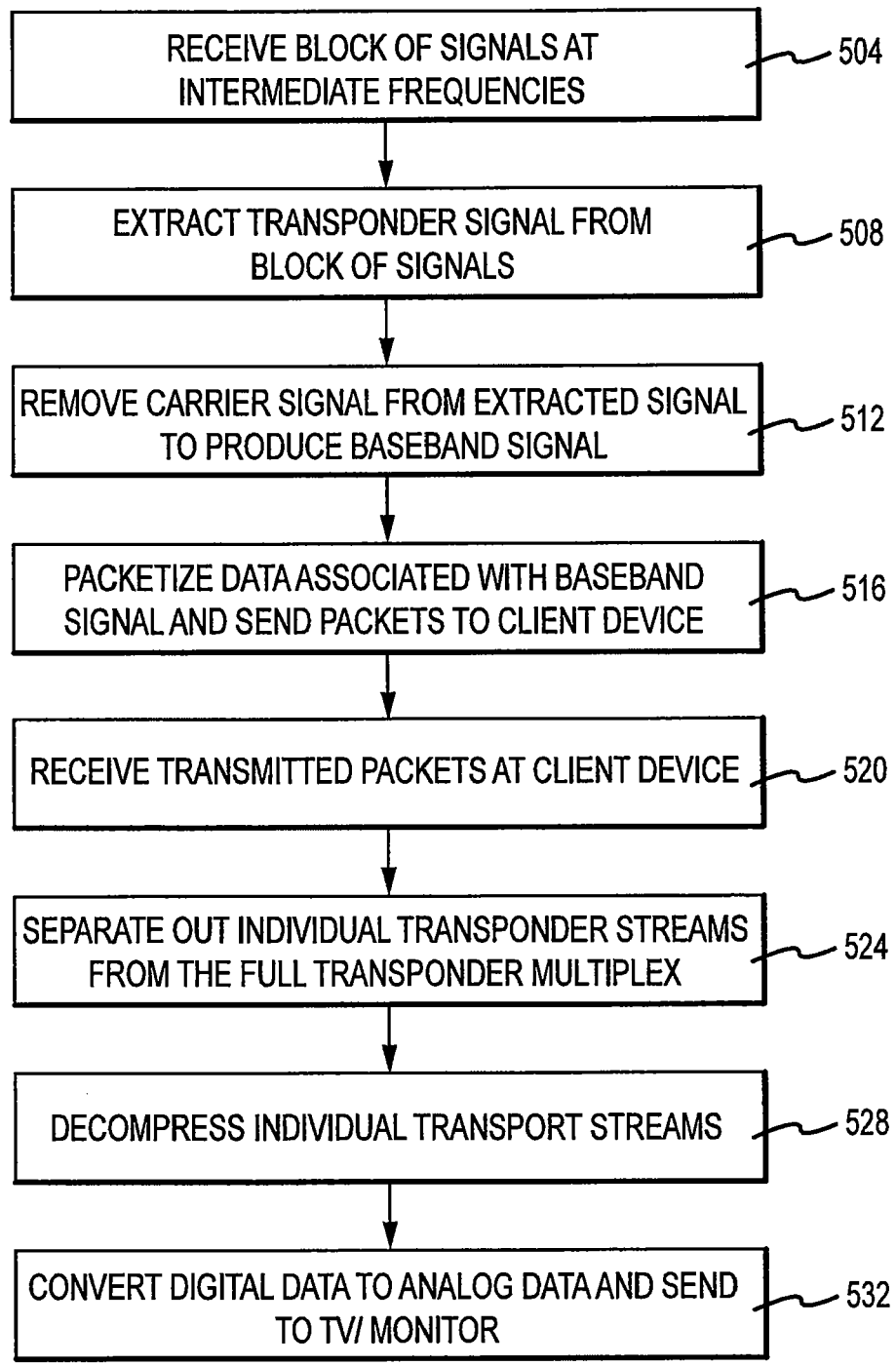
FIG. 5 is a flow chart showing operations in a method of receiving satellite television service.

FIG. 5 is flow chart showing operation in a method in accordance with implementations discussed herein. FIG. 5 illustrates a method for receiving satellite television signals and may be understood with reference to the system shown in FIG. 2. Initially at operation 504, a block of signals at an intermediate frequency range is received. The block of signals may be received from satellite antenna 112, which converts a downlinked satellite signal to the signals carried on the intermediate frequencies. The block of signals may be then transmitted to a centralized system component, such as the tuner and demodulator 204, which may be located proximate to the satellite antenna 112. Following operation 504, operation 508 may be executed.

At operation 508, the block of frequencies may be initially processed by a tuner 120 component of the tuner and demodulator 204. The tuner 120 may process the block of signals to extract a particular transponder signal that is directed to the demodulator 124 for processing at operation 512. At operation 512, the demodulator 124 removes a carrier signal from the extracted transponder signal to produce a baseband signal that is directed to the network adaptor 208 for further processing at operation 516. At operation 516, data associated with the baseband signal is packetized and sent to a client device 220 by means of a network transaction. The data sent at operation 516 may represent a full transponder multiplex.

Following operation 516, operation 520 may be executed. At operation 520, data is received at a client device 220 through the network transaction initiated in operation 516. The data received at operation 520 may be directed to a demultiplexer 128 for further processing at operation 524. At operation 524, the demultiplexer 128 may separate out individual transport streams that are combined in the full transponder multiplex received at the client device 220. The individual transport streams may be directed to a decoder 132 for further processing at operation 528. At operation 528, the individual transport streams may be decompressed and sent to an A/V processing unit 136 for further processing at operation 532. At operation 532, the decompressed data streams may be converted from digital to analog and the analog or HDMI signal sent as output from the client device 220 to be received by a TV/monitor 140.

Figure 6:
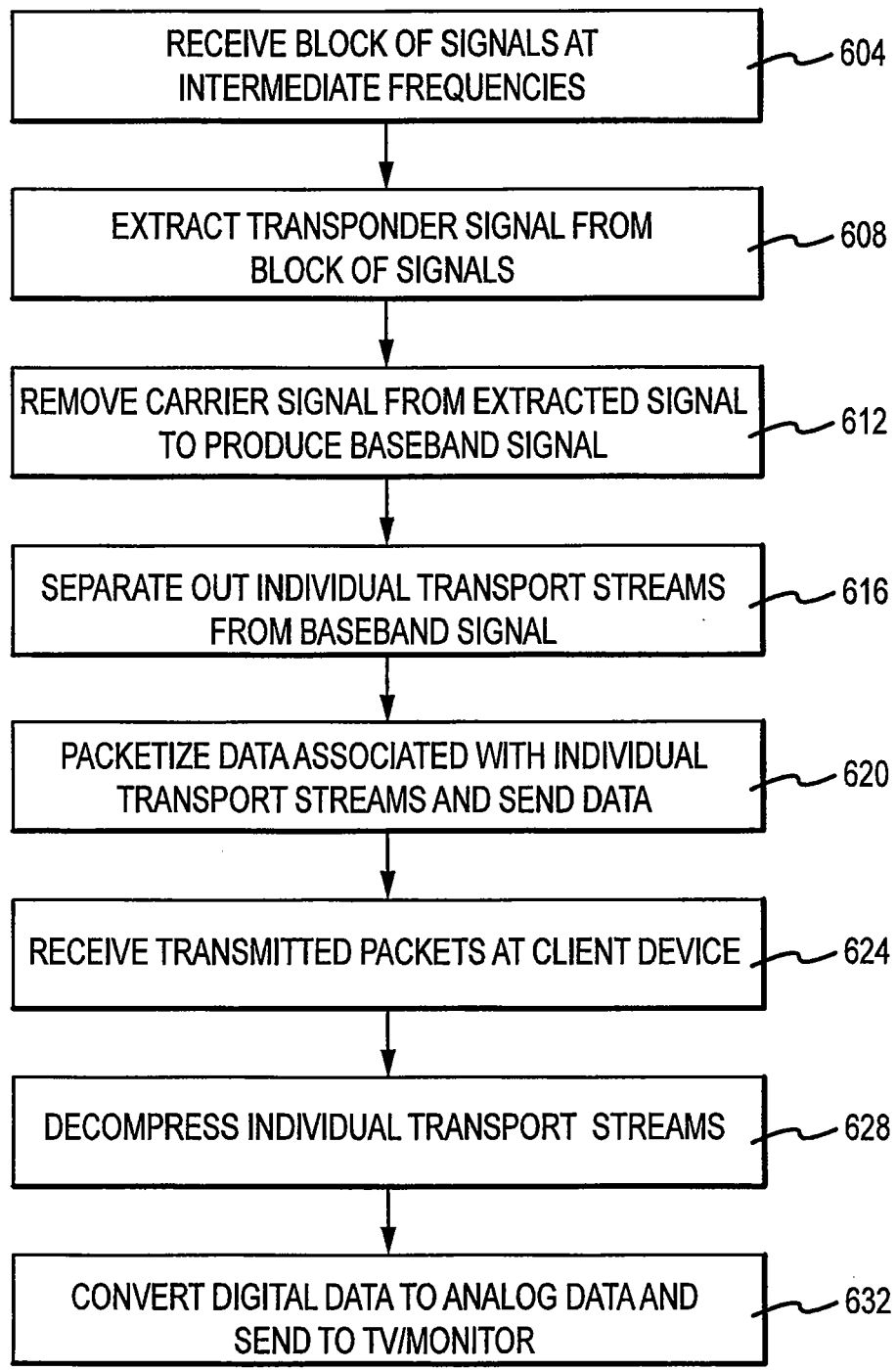
FIG. 6 is a flow chart showing operations in another method of receiving satellite television service.

FIG. 6 is flow chart showing operation in a method in accordance with implementations discussed herein. FIG. 6 illustrates a method for receiving satellite television signals and may be understood with reference to the system shown in FIG. 3. Initially at operation 604, a block of signals at an intermediate frequency range is received. The block of signals may be received from satellite antenna 112, which converts a downlinked satellite signal to the signals carried on the intermediate frequencies. The block of signals may be received a centralized system component, such as the tuner, demodulator and demux section 304, which may be located proximate to the satellite antenna 112. Following operation 604, operation 608 may be executed.

At operation 608, the block of frequencies may be initially processed by a tuner 120 component of the tuner, demodulator and demux section 304. The tuner 120 may process the block of signals to extract a particular transponder signal that is directed to the demodulator 124 for processing at operation 612. At operation 612, the demodulator 124 removes a carrier signal from the extracted transponder signal to produce a baseband signal that is directed to a demultiplexer 128 for further processing at operation 616. At operation 616, the demultiplexer 128 may separate out individual transport streams that are combined in the full transponder multiplex output from the tuner 120. The individual transport streams may be directed to the network adaptor 208 for further processing at operation 620. At operation 620, the individual transport streams may be packetized and sent to client device 320 by means of a network transaction.

Following operation 620, operation 624 may be executed. At operation 624, data is received at a client device 320 through the network transaction initiated in operation 620. The data received at operation 624 may be directed to a decoder 132 for further processing at operation 628. At operation 628, the individual transport streams may be decompressed and sent to an A/V processing unit 136 for further processing at operation 632. At operation 632, the decompressed data streams may be converted from digital to analog and the analog or uncompressed digital signal is sent as output from the client device 320 to be received by a TV/monitor 140.

Figure 7:
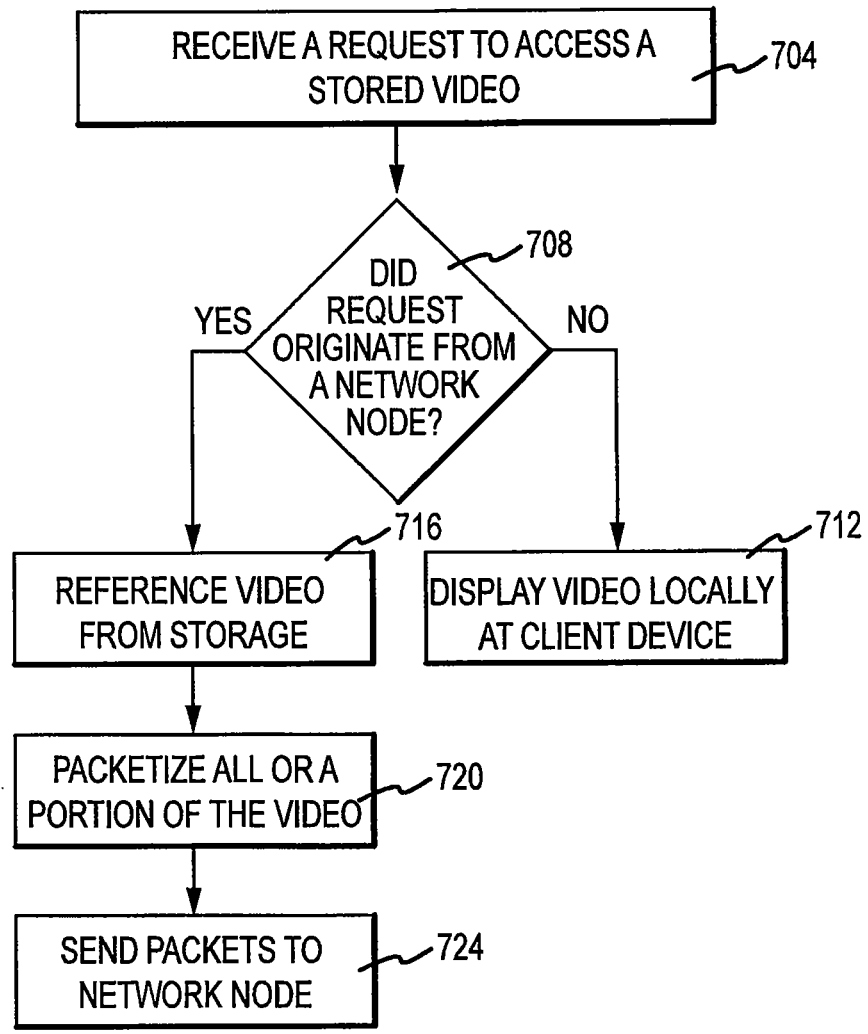
FIG. 7 is a flow chart showing operation in a method of sharing videos in a satellite system.

FIG. 7 is flow chart showing operation in a method in accordance with implementations discussed herein. FIG. 7 illustrates a method for sharing videos in a satellite system and may be understood with reference to the system shown in FIG. 4. Initially, at operation 704 a request for access to a stored video is received by a set-top box 220 or set-top box component. The video may be stored in the storage media 412 and may have been stored in there as a result of a number of operations or functions associated with the set-top box 220. In one instance, the video may be a recording that was obtained by the operation of the recorder 408. In another instance, the video may a pay-per-view feature that was purchased and downloaded. Whether a recoding, a pay-per-view feature other video type, the video may have arrived at the set-top box 220 through one of the satellite signal reception paths illustrated in FIGS. 1-6. Following operation 704, operation 708 may be executed.

At operation 708, a determination is made as to whether the request for access to the video originated from a network node. Operation 712 may follow operation 708 in the case that the request did not originate from a network node. At operation 712, the video is retrieved from the storage 412 and displayed at the TV/monitor 140 associated with the set-top box 220. Operation 716 may follow operation 708 in the case that the request did originate from a network. Here, the request may have originated from a client device 220 or set-top box that is attached to the home network. In other embodiments, the request may have been received from across the Internet 416. In any event, at operation 716, the video is retrieved from the storage device 412 and sent to the network adapter 216 for further processing at operation 720. At operation 720, all or a portion of the video is packetized in an appropriate format. Operation 724 may follow operation 720. At operation 724 the packets produced in operation 720 may be sent to the network node that requested access to the stored video.

The foregoing merely illustrates certain principles of certain implementations. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

The invention claimed is:

1. In a satellite receiving system, a client device comprising:
   a network adapter operable to:
      receive a number of packets, the packets comprising a packetized stream of multiplexed data received from a satellite antenna, the packets having been formed and transmitted by a tuner and demodulator section located proximate to the satellite antenna, wherein the tuner and demodulator section has multiple tuners;
      transmit a packetized request that includes a channel change command to the tuner and demodulation section, wherein the packetized request is used to select the tuner from the multiple tuners;
      receive a request for a stored audiovisual program from a network node, the request for the stored audiovisual program being received through the network adapter; and
      in response to receiving the request, transmit the stored audiovisual program to the network node through the network adapter;
   a demultiplexer connected to the network adapter, the demultiplexer operable to separate out individual transport streams from the packets received by the network adapter;
   a storage medium operable to store the stored audiovisual program based on an individual transport stream of the individual transport streams from the packets received by the network adapter;
   a decoder connected to the demultiplexer, the decoder operable to receive the individual transport streams form the demultiplexer and to decode audio, a video and/or data associated with the individual transport streams into digital data in a first format; and
   an audio visual processing unit connected to the decoder, the audio visual processing unit operable to convert digital data in the first format to one or more signals having a second format and to output the signals having a second format.

2. The client device of claim 1, further comprising:
   a storage medium operable to store one or more videos;
   wherein the video may be shared with other client devices through one or more network transactions issued through the network adapter.

3. The client device of claim 2, wherein the video is a high-definition video.

4. The client device of claim 2, wherein the storage medium is associated with a removable device.

5. The client device of claim 1, further comprising:
a processor operable to at least process user input commands, wherein user input commands that include a channel change are packetized and sent to a tuner through the network adapter.

6. The client device of claim 1, wherein the packets received at the network adapter are received over a coaxial cable connected to an input.

7. The client device of claim 6, wherein the coaxial cable is a portion of a network that interconnects a number of client devices.

8. A method of receiving satellite television signals, comprising:
receiving a block of intermediate frequency signals, the intermediate frequency signals having been down converted from a satellite downlink signal;
receiving a packetized request from a client device that indicates a channel change command for an appropriate tuner of a plurality of tuners;
filtering the block of intermediate frequency signals by the appropriate tuner to remove a transponder signal having multiplexed data, the transponder signal corresponding to the channel change command received from the client device;
demodulating the transponder signal by a demodulator to produce a baseband signal having multiplexed data;
packetizing the multiplexed data from the baseband signal at a network adapter to produce packetized multiplexed data;
transmitting the packetized multiplexed data set from the network adapter across a network to be received by the client device;
receiving the packetized multiplexed data at the client device through a second network adapter of the client device;
in response to receiving the packetized multiplexed data, demultiplexing the packetized multiplexed data to produce an individual transport stream;
using the individual transport stream, storing digital data as a stored audiovisual program by the client device;
receiving a request for the stored audiovisual program from a network node, the request for the stored audiovisual program being received through the second network adapter of the client device; and
in response to receiving the request, transmitting the stored audiovisual program to the network node through the second network adapter of the client device.

9. The method of claim 8, further comprising:
in response to demultiplexing the packetized multiplexed data, decoding the individual transport stream to produce a decompressed digital data stream;
in response to decoding the individual transport stream, converting the digital data stream to one or more analog data streams; and
in response to converting the digital data, outputting the one or more analog data streams from the client device to a television or monitor.

10. The method of claim 8, further comprising:
receiving a channel change command at the client device;
in response to receiving the channel change command, transmitting the command across the network;
in response to sending the channel change command to the tuner, receiving the channel change command at the tuner; and
in response to receiving the channel change command at the tuner, adjusting the tuner to remove a transponder signal that carriers a channel specified by the channel change command.

11. The method of claim 8, wherein the network node is a second client device associated with a home network to which the client device is attached.

12. The method of claim 8, wherein the request for the stored content is received from across the Internet.

* * * * *